Feb. 4, 1947.    R. P. PESCARA    2,415,110
POWER PLANT
Filed April 6, 1944

INVENTOR
Raul Pateras Pescara
BY
Dean Fairbank & Hirsch
his ATTORNEYS

Patented Feb. 4, 1947

2,415,110

UNITED STATES PATENT OFFICE 2,415,110

POWER PLANT

Raul Pateras Pescara, Lisboa, Portugal

Application April 6, 1944, Serial No. 529,830
In France August 2, 1943

6 Claims. (Cl. 60—13)

My invention relates to power plants comprising prime movers actuated by gases from free-piston auto-generators, wherein each auto-generator comprises an internal-combustion cylinder with a power piston coupled with a compressor piston adapted to produce compressed air for scavenging the internal-combustion cylinder, the hot mixture of air and burnt gases, which exhausts under pressure from the cylinder, being directed towards the prime movers, which are generally in the form of one or several gas turbines.

One object of my invention is to provide a power plant of the character above-described, wherein the auto-generator or auto-generators may be superfed, more particularly at high loads, by a blower driven by an auxiliary turbine actuated by gases bled from the main turbine or turbines.

Another object of my invention is to provide heat-exchanging means whereby the gases adapted to actuate the auxiliary turbine may be re-heated by heat derived from the gases from the auto-generator or auto-generators.

A further object of my invention consists in actuating the auxiliary turbine, wholly or in part, directly by gases derived from the auto-generator or auto-generators.

Still a further object of my invention is a controlling arrangement whereby the auxiliary turbine is actuated at light or average loads by gases bled from the main turbine or turbines, and at high loads by gases directly derived from the auto-generator or auto-generators.

Figure 1:
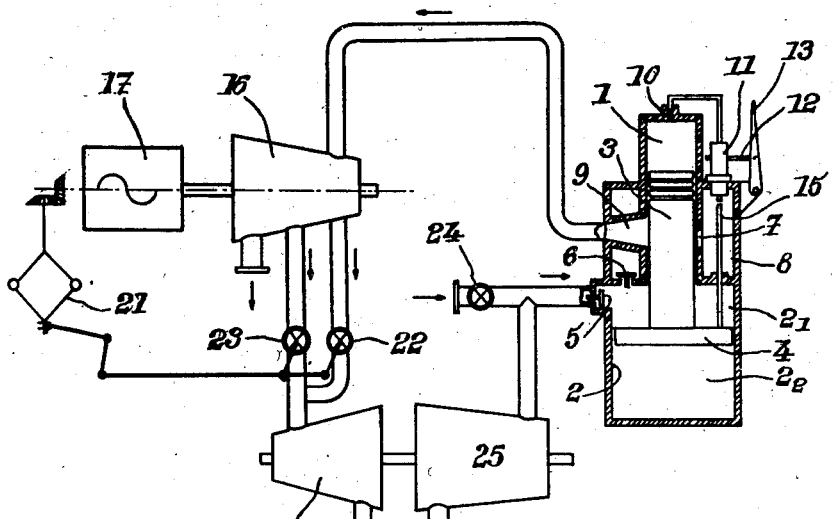

In the annexed drawing:

Fig. 1 diagrammatically shows a power plant established in accordance with my invention.

Figure 2:
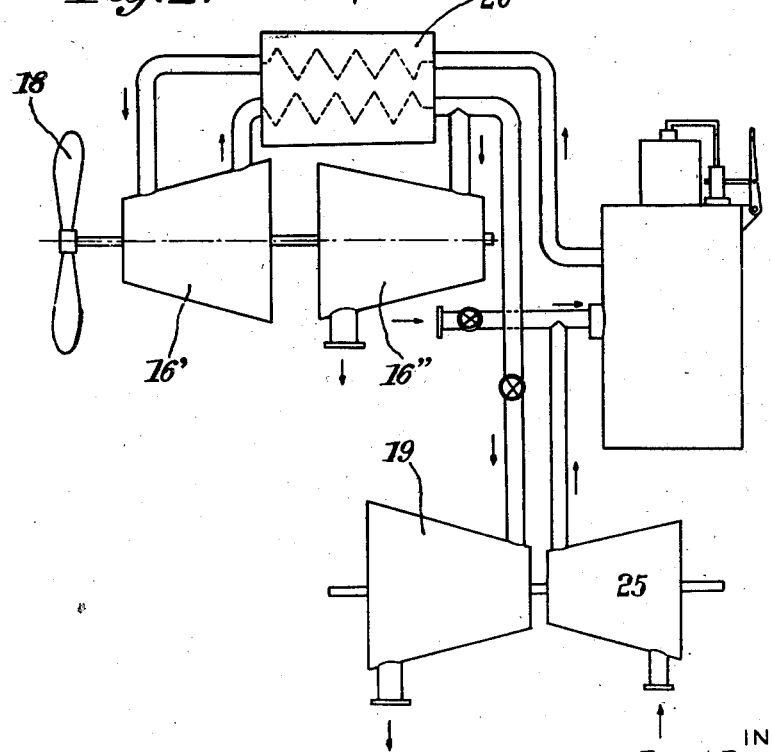

Fig. 2 shows a modification thereof.

The power plant shown in Fig. 1 comprises a free-piston generator embodying an internal combustion cylinder or power cylinder 1 and a compressor cylinder 2. The movable unit of the auto generator comprises a power piston 3 cooperating with the power cylinder 1 and a compressor piston 4 slidable within the compressor cylinder 2. Piston 4 divides cylinder 2 into two chambers $2_1$ and $2_2$. Chamber $2_1$ situated on the inner side of piston 4, is provided with inlet and exhaust valves 5 and 6 and works as a compressor proper, while chamber $2_2$ on the outer side of piston 4 forms a pneumatic cushion adapted to ensure the return stroke of the movable unit 3—4.

The lower part of cylinder 1 is provided with an inlet port 7 opening into a casing 8 surrounding 1, said casing receiving compressed air from chamber $2_1$ through valve 6. Cylinder 1 is also provided with a lower exhaust port 9 for the burnt gases and the excess of scavenging air.

There is also provided in cylinder 1 an injection nozzle 10 fed by an injection pump 11 which may be adjusted, in a manner per se well-known, by means of a rod 12 controlled by a lever 13. Pump 11 is actuated by a push rod 15 mechanically connected with the movable unit 3—4.

Compressed air from casing 8 enters cylinder 1 when the movable unit 3—4 is in the vicinity of its lower dead point, and it ensures the scavenging of the burnt gases and the replenishing of cylinder 1 with fresh air. The hot mixture of burnt gases and excess of scavenging air, still under a high pressure, is introduced into the main turbine 16 wherein it expands. In the example shown in Fig. 1, the main turbine 16 drives an electric generator 17, while in the modification of Fig. 2, the main turbines 16', 16'' drive a screw propeller 18.

In order to increase the power available, the auto-generator is superfed by means of air under pressure introduced into the compressor part thereof. In the known constructions, this was effected by means of a turbo-blower 25 driven by an auxiliary turbine 19 actuated either as an independent unit by gases from the auto-generator, the main and the auxiliary turbines thus running in parallel, or by the gases actuating the main turbine, the auxiliary turbine being connected in series on the main gas line, either before or preferably after the main turbine. With the first method, the auxiliary turbine had to operate with gases under high pressure and at high temperature, which led to machines of expensive construction, with a large number of stages and a low efficiency owing to their relatively reduced power. The second method required an elaborate gas piping and led to difficulties in power control.

In the power plant according to Fig. 1, the auxiliary turbine 19 which drives the superfeed blower 21 is actuated by gases bled from an intermediate stage of the main turbine 16. This construction permits of using an auxiliary turbine operating with gases under average pressure and at relatively low temperatures; such a machine is inexpensive and may have a high efficiency; the piping required is simple.

In the power plant illustrated in Fig. 2, the gases adapted to actuate the auxiliary turbine 19 are derived from the main gas circuit between the high pressure turbine 16' and the low pressure turbine 16", which leads to the same advantages.

The gases passing from turbine 16' to turbine 16" are re-heated by heat from the high-pressure gases from the auto-generator, by means of a heat-exchanger 20. The gases actuating turbine 19 are derived after exchanger 20.

In both cases it is observed in practice that if power control is effected by varying fuel admission in the auto-generator fuel injection system, without any direct action on the main turbine or turbines (i. e. without any throttling, bypassing and the like), the superfeeding pressure varies in accordance with the working pressure in a manner more appropriate to the requirements of auto-generators than with known arrangements above-described. The gross efficiency of the power plant is therefore increased.

Means are preferably provided to speed up the turbo-blower unit, when necessary, by admission of high-pressure gases from the auto-generator. In Fig. 1 this auxiliary admission is controlled by a centrifugal governor 21 actuating a valve 22 on a pipe leading from the high pressure stage of the main turbine 16 to the auxiliary turbine 19. Governor 21 also actuates a valve 23 inserted on the pipe through which gases are bled from the main turbine 16. When the speed of the main turbine decreases, valve 23 is closed while valve 22 is opened, whereby the auxiliary turbine takes up speed rapidly.

There may also be provided an auxiliary valve 24 whereby air at atmospheric pressure may be directly admitted into the auto-generator at low loads, without any superfeeding.

I claim:

1. A power plant comprising a free-piston auto-generator; a prime mover unit, means to conduct gases under pressure from said free-piston auto-generator to said prime mover unit, said prime mover unit having a plurality of pressure stages; a blower connected to said free-piston auto-generator to superfeed the same with air under pressure; a motor driving said blower, and means to conduct to said motor gases bled from an intermediate pressure stage of said prime mover unit.

2. A power plant comprising a free-piston auto-generator; a gas turbine, means to conduct gases under pressure issuing from said free-piston auto-generator to said turbine, said gas turbine having a plurality of pressure stages; a turbo-blower unit connected to said free-piston auto-generator to superfeed the same with air under pressure; and means to conduct to said turbo-blower unit gases bled from an intermediate pressure stage of said turbine.

3. A power plant comprising a free-piston auto-generator; a plurality of gas turbines forming a compound prime mover unit, means to conduct gases under pressure issuing from said free-piston auto-generator to said prime mover unit; a turbo-blower unit connected to said free-piston auto-generator to superfeed the same with air under pressure; and means to conduct to said turbo-blower unit gases bled from said compound prime mover unit at an intermediate point between two successive turbines of said compound prime mover unit.

4. A power plant comprising a free-piston auto-generator; a compound prime mover unit embodying a high pressure gas turbine element and a low pressure gas element, means to conduct to said turbines successively gases under pressure issuing from said free-piston auto-generator; a heat exchanger in said connecting means between said turbines adapted to re-heat gases exhausting from said high pressure gas turbine element, means for delivering to said heat exchanger heating gases under pressure issuing from said free-piston auto-generator; a turbo-blower unit connected to said free-piston auto-generator to superfeed the same with air under pressure; and means to conduct to said turbo-blower unit gases derived from said compound prime mover unit between said heat exchanger and said low pressure gas turbine element.

5. A power plant comprising a free-piston auto-generator; a prime mover unit, means to conduct gases under pressure from said free-piston auto-generator to said prime mover unit, said prime mover unit having a plurality of pressure stages; a blower connected to said free-piston auto-generator to superfeed the same with air under pressure; a gas motor connected to said blower; means to conduct to said gas motor gases from an intermediate pressure stage of said prime mover unit; means to conduct to said gas motor gases issuing from said free-piston auto-generator; and valve means for controlling the flow to said gas motor from either to either of said two last-named means.

6. A power plant comprising a free-piston auto-generator; a prime mover unit, means to conduct gases under pressure from said free-piston auto-generator to said prime mover unit, said prime mover unit having a plurality of pressure stages; a blower connected to said free-piston auto-generator to superfeed the same with air under pressure; a gas motor connected to said blower; means to conduct to said gas motor gases from an intermediate pressure stage of said prime mover unit; means to conduct to said gas motor gases issuing from said free-piston auto-generator; and means responsive to the speed of said prime mover unit to bring into action said second-named conducting means at normal speed and said third-named conducting means when the speed falls below normal.

RAUL PATERAS PESCARA.

REFERENCES CITED

The following references are of record in the file of this patent:

UNITED STATES PATENTS

| Number | Name | Date |
|---|---|---|
| 1,785,643 | Noack et al. | Dec. 16, 1930 |
| 2,011,420 | Samuelson | Aug. 13, 1935 |
| 1,723,697 | Hartmann | Aug. 6, 1929 |
| 2,147,935 | Steiner | Feb. 21, 1939 |

FOREIGN PATENTS

| Number | Country | Date |
|---|---|---|
| 467,423 | British | June 16, 1937 |
| 368,318 | British | Mar. 4, 1932 |